US009892479B1

(12) United States Patent
Pruitt

(10) Patent No.: US 9,892,479 B1
(45) Date of Patent: Feb. 13, 2018

(54) INDEPENDENT MONITORING OF GRAPHICS PROCESSING UNITS

(71) Applicant: James S. Pruitt, Marion, IA (US)

(72) Inventor: James S. Pruitt, Marion, IA (US)

(73) Assignee: ROCKWELL COLLINS, INC, Cedar Rapids, IA (US)

( * ) Notice: Subject to any disclaimer, the term of this patent is extended or adjusted under 35 U.S.C. 154(b) by 76 days.

(21) Appl. No.: 13/795,735

(22) Filed: Mar. 12, 2013

(51) Int. Cl.
| | |
|---|---|
| *G06T 1/20* | (2006.01) |
| *G06F 15/16* | (2006.01) |
| *G06F 15/80* | (2006.01) |
| *G06F 3/14* | (2006.01) |
| *G01D 7/02* | (2006.01) |
| *G01C 23/00* | (2006.01) |

(52) U.S. Cl.
CPC .............. *G06T 1/20* (2013.01); *G01C 23/00* (2013.01); *G01D 7/02* (2013.01); *G06F 3/14* (2013.01); *G09G 2330/08* (2013.01); *G09G 2340/125* (2013.01); *G09G 2380/12* (2013.01)

(58) Field of Classification Search
CPC ..... G06T 15/005; G06T 1/20; G09G 2380/12; G09G 2340/125; G09G 2330/08; G01C 23/00; G01D 7/02; G06F 3/14
USPC .......................................... 714/758; 345/589
See application file for complete search history.

(56) References Cited

U.S. PATENT DOCUMENTS

| | | | |
|---|---|---|---|
| 8,159,464 B1 | 4/2012 | Gribble et al. | |
| 2002/0112205 A1* | 8/2002 | Gross et al. | 714/701 |
| 2003/0233609 A1* | 12/2003 | Ikonomopoulos et al. | 714/758 |
| 2007/0046680 A1* | 3/2007 | Hedrick et al. | 345/503 |
| 2008/0049028 A1* | 2/2008 | Hancock et al. | 345/502 |
| 2012/0268475 A1* | 10/2012 | Hancock | 345/589 |

OTHER PUBLICATIONS permadi.com, "Introduction to Mask," downloaded from http://permadi.com/tutorial/flashMask on Feb. 16, 2016; 7 pages.
wikipedia.org, "Mask (computing)," downloaded from https://en.wikipedia.org/wiki/Mask_(computing) on Feb. 16, 2016; 6 pages.

* cited by examiner

*Primary Examiner* — Kyle Vallecillo
(74) *Attorney, Agent, or Firm* — Lawrence N. Ginsberg

(57) ABSTRACT

A system for monitoring graphics processing units, including an image merge element; a database memory, operatively connected to the image merge element; and, a comparator element. The image merge element is configured to: i) receive visible image data from a graphics processing unit (GPU); ii) extract a symbol identifier; iii) receive a mask; and, iv) calculate a cyclic redundancy check (CRC) of a masked portion of the visible image data corresponding to the mask. The database memory is operatively connected to the image merge element. The database memory includes: a mask database including lookup tables of masks for defined areas of the visible image data indexed by the extracted symbol identifier; and, a CRC signature database including a table of valid CRCs for the image data indexed by the extracted symbol identifier. The comparator element is configured to: i) receive, from the image merge element, the calculated CRC of the masked portion of the visible image data; ii) receive, from the database memory, a valid CRC of a desired image from the indexed table of valid CRCs for the visible image data; and, iii) compare the calculated CRC with the valid CRC of a desired image for providing a fault indication for processing.

14 Claims, 4 Drawing Sheets

INDEPENDENT MONITORING OF GRAPHICS PROCESSING UNITS

BACKGROUND OF THE INVENTION

1. Field of the Invention

The present invention relates to display systems and more particularly to independent monitoring of graphics processing units.

2. Description of the Related Art

Commercial Graphics Processing Units (CGPUs) are currently limited to non-certified systems and lower criticality certified systems due to the inability to adequately verify the images they create. These modern 3D Commercial Off The Shelf (COTS) graphics devices are not fixed functionality. Their functionality is programmable. These programs cause the devices to function differently from program to program.

Current certifiable systems for avionics display systems use a CGPU to generate non-certifiable images, and a custom (e.g., GE4) certifiable graphics subsystem to generate certifiable images. This imposes the cost of two GPUs. Certification of CGPUs could allow lower cost, more competitive solutions.

As will be disclosed below, the present invention assures proper operation of the CGPU.

SUMMARY OF THE INVENTION

In a broad aspect, the present invention is a system for monitoring graphics processing units, including an image merge element; a database memory, operatively connected to the image merge element; and, a comparator element. The image merge element is configured to: i) receive visible image data from a graphics processing unit (GPU); ii) extract a symbol identifier; iii) receive a mask; and, iv) calculate a cyclic redundancy check (CRC) of a masked portion of the visible image data corresponding to the mask. The database memory is operatively connected to the image merge element. The database memory includes: a mask database including lookup tables of masks for defined areas of the visible image data indexed by the extracted symbol identifier; and, a CRC signature database including a table of valid CRCs for the image data indexed by the extracted symbol identifier. The comparator element is configured to: i) receive, from the image merge element, the calculated CRC of the masked portion of the visible image data; ii) receive, from the database memory, a valid CRC of a desired image from the indexed table of valid CRCs for the visible image data; and, iii) compare the calculated CRC with the valid CRC of a desired image for providing a fault indication for processing. The present invention assures that the graphics process unit operates properly for safety critical applications.

In a preferred embodiment, the image merge element, the database memory, and the comparator element are components of an avionics display system. The image merge element extracts the symbol identifier stored by image generation software utilized for generating commands and data issued to a CGPU. The CRC is calculated with a 64 bit algorithm to achieve a fault detection of one fault in a billion. The display is operable in a plurality of defined formats, each defined format comprising a plurality of associated symbols. The database memory outputs a mask based on the symbol identifier for selecting an area of the format.

DETAILED DESCRIPTION OF THE INVENTION

Figure 1:
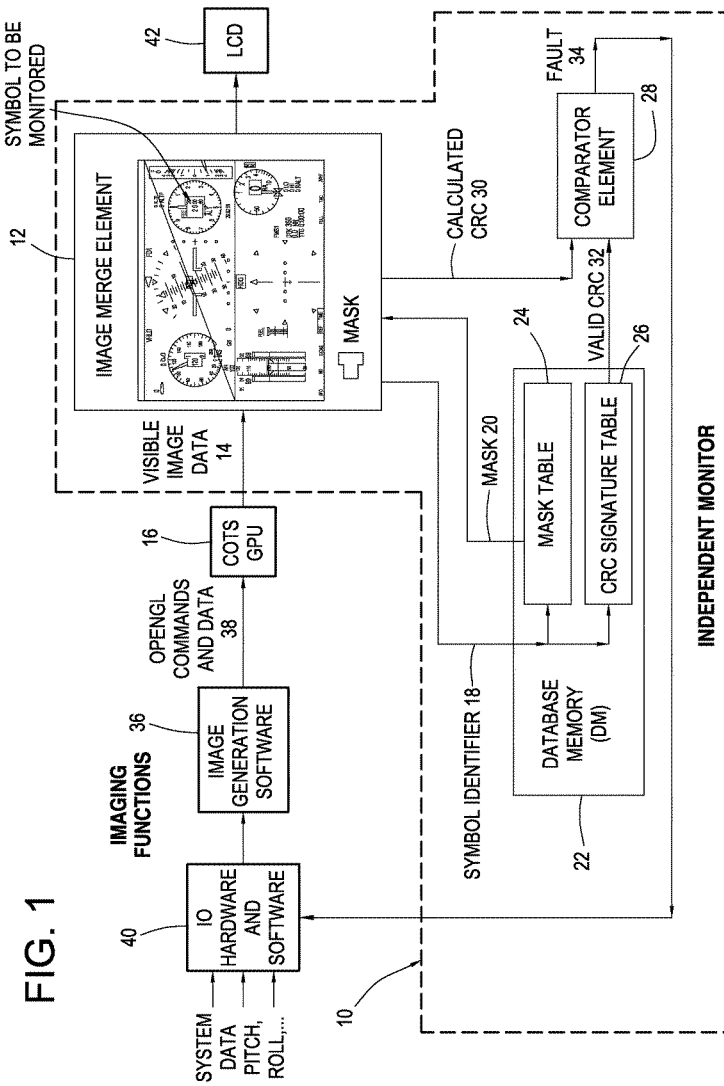
FIG. 1 is a schematic block diagram of the system for generating a typical primary flight display of an aircraft incorporating the principles of the present invention to monitor critical information.

Referring now to the drawings and the characters of reference marked thereon, FIG. 1 illustrates one embodiment of the system for monitoring graphics processing units of the present invention, designated generally as 10. An image merge element 12 is configured to receive visible image data 14 from a graphics processing unit (GPU) 16, typically a commercial graphics processing unit (CGPU). The image merge element 12 extracts a symbol identifier 18. It receives a mask 20. As will be discussed below in detail, the image merge element 12 is configured to calculate a cyclic redundancy check (CRC) of a masked portion of the visible image data 14 corresponding to the mask 20.

The image merge element 12 may be, for example, a Field Programmable Gate Array (FPGA) or custom integrated circuit. The device should be certifiable to the necessary design assurance level, and is preferably developed in accordance with DO-254. The output of the image merge element 12 may drive, for example, a Liquid Crystal Display (LCD) 42.

As used herein the term "mask" refers to a data object that specifies a portion of the displayed image. For example, a mask could be a pair of horizontal and vertical image coordinates that define a rectangular portion of the displayed image. As another example, the mask could be a stored outline (i.e. stencil or bitmap) within the displayed image. As used herein the term "masked portion" refers to a portion of the displayed image specified by the mask. In the case where the mask is a pair of horizontal and vertical image coordinates, masking could be accomplished by sampling the displayed image between the horizontal and vertical coordinates specified. In the case where the mask is a stencil, masking may be accomplished, for example, by simply "logically and'ing" the mask stencil image with the displayed image.

A database memory 22 is operatively connected to the image merge element 12. The database memory, designated generally as 22, includes a mask database 24 comprising a lookup table of masks for defined areas of the visible image data, indexed by the extracted symbol identifier 18. It also includes a cyclic redundancy check (CRC) signature database 26 comprising a table of valid CRCs for the image data, indexed by the extracted symbol identifier 18. The database memory 22 is preferably a flash EPROM (erasable programmable read only memory). Other examples of database memory are RAM (random access memory), or other type of high speed memory.

A comparator element 28 is configured to: receive, from the image merge element, the calculated CRC 30 of the masked portion of the visible image data; and, receive, from the database memory 22, a valid CRC 32 of a desired image from the indexed table of valid CRCs for the image data. The comparator element 28 compares the calculated CRC 30 with the valid CRC 32 of a desired image for providing a fault indication 34 for processing. The comparator element 28 performs an exclusive-or (XOR) logical operation on each of the 64 bit positions in the calculated CRC 30 and the valid CRC 32. If any of the 64 results is logic 1, then a fault has been detected.

Typically this fault indication 34 is directed to appropriate image generation software 36 that provides commands and data 38 to be issued to the GPU 16.

In a preferred embodiment, the inventive principles of the present invention may be implemented with a flight display for an aircraft with critical information, as shown in FIG. 1. In order to meet a Level A (catastrophic function) safety requirement, monitoring hardware (such as the image merge) must be independent of the CGPU processing and achieve essentially 100% fault detection. To achieve this, the monitor must verify the visible critical symbology (not test patterns as is typically done). In this instance, a typical format ("page") has multiple discrete symbols, each driven by aircraft parameters that vary with time. A portion of this symbology is flight critical, where an erroneous indication can cause a hazardous or catastrophic condition. An effective monitor must compare the symbology with the "expected symbology." The present invention verifies each symbol independently and determines that the image is valid only if all critical symbols are valid.

The Input/Output (IO) hardware and software 40 receives system data, such as pitch, roll, etc. This system data is directed to the image generation software 36. The image generation software may be a program executing on a general purpose processor within a display unit, or may be such a program residing in a computer external to the display unit. The image generation software 36 provides, for example, OpenGL® commands and data to the graphics processing unit (GPU) 16, which in this application is a commercial off the shelf item, such as a GPU marketed by Advanced Micro Devices, Inc. (AMD) under the trademark E2400. In a preferred embodiment, the image generation software specifies the masks atop visually unchanging symbols then alters the symbol drawing commands to produce distinct, verifiable CRCs without visually changing the appearance of the symbol The image merge element 12, which is an integrated circuit, for example a field-programmable gate array (FPGA), blends the outputs of the image channels. The image generation software writes the symbol identifier to the image merge element. Specifically, the symbol identifier contains the page identifier (that selects the multiple masks) and the values (e.g. 16 bits) of the parameters used by the software to draw the symbols. The image merge element also calculates the actual CRC of each masked portion of the image.

The database memory 22 (e.g. FLASH EPROM) stores the "expected" value of every valid critical symbol. As discussed above, the memory contains a table of symbol "masks" for each defined page. For example, a symbol identifier equal to "Primary Flight Display," as illustrated in numeral designation 12 would specify mask regions for altitude, air speed, heading, etc. Further, as also discussed above, the memory also contains a table of valid CRCs for each critical symbol, in a preferred embodiment, indexed by the 16-bit value of the associated parameter. (For example, 65,536 CRCs, one for each altitude symbol for 0 feet to 65,535 feet, could be stored.)

The comparator element 28 includes the logic that evaluates the display by comparing the actual CRCs with the valid CRCs. It may be implemented into the Merge FPGA, i.e. image merge element 12. It could be integrated into the display assembly if a remote display is used.

The output of the image merge element 12 may drive, for example, a Liquid Crystal Display (LCD) 42.

Thus, summarizing the operation of a preferred embodiment of the present monitoring system:

1. Software truncates parameters to 16 bits and uses this data to draw the symbology.
2. Software writes the page identifier to the image merge element then outputs the image.
3. The image merge element 12 decodes the page identifier and looks up the critical symbol regions for that page.
4. As the image is sent to the LCD, the image merge element 12 calculates the CRCs for each region.
5. After the end of the field, the image merge element 12 looks up each valid CRC in the database memory 22 using the parameter as the index to the data. For example, the image merge element 12 would use the altitude parameter "2000" shown in image merge element 12 (meaning 20000 feet, since the least significant digit is not displayed) to extract the $20,000^{th}$ CRC in the CRC table of the database memory. This CRC would be the valid (expected) result of the CRC calculation over the altitude mask region. If the XOR of all 64 bits of the valid and calculated CRCs result is any logic ones, the CRCs match.
6. If all CRCs match, no action is taken. If a persistent mismatch is found (using filtering), the comparator element 28 causes the image merge to remove or annunciate this erroneous data.

In a preferred embodiment, a CRC length of 64 bits is used to accommodate the large number (typically over 65,000) of valid CRCs while being able to detect an erroneous CRC. The CRC is calculated with an algorithm with sufficient resolution to meet the hazard requirement. For example, a catastrophic hazard must have a probability no greater than once in a billion flight hours. A CRC with a length of 64 bits will meet this requirement.

The database memory 22 can be implemented in a single FLASH memory. The memory size is mainly driven by the CRC tables. A conservative estimate for 8 critical formats, with 64 parameters per format, 65536 values per parameter, and 8 bytes per CRC is 256 Mbytes.

Although the CRC has been discussed as the mechanism for generating a signature of the visible image data, other mechanisms can be utilized such as a check sum, pixel compare, etc.

The system of the present invention has several benefits. Coverage—the displayed image is tested. Independence—eliminates common mode processor faults to reduce hazard rate. Speed—CRCs can be computed as the image is output. Synchronized—Inherently synchronized image and underlying parameters. Detection of single event upsets—Corruption of the graphics address remapping table, textures, or fixed symbol data is inherently detected. Data-driven—no software to re-certify if formats change. The database generation can be automated by stepping each symbol through its range and storing the CRCs in a file.

Figure 2:
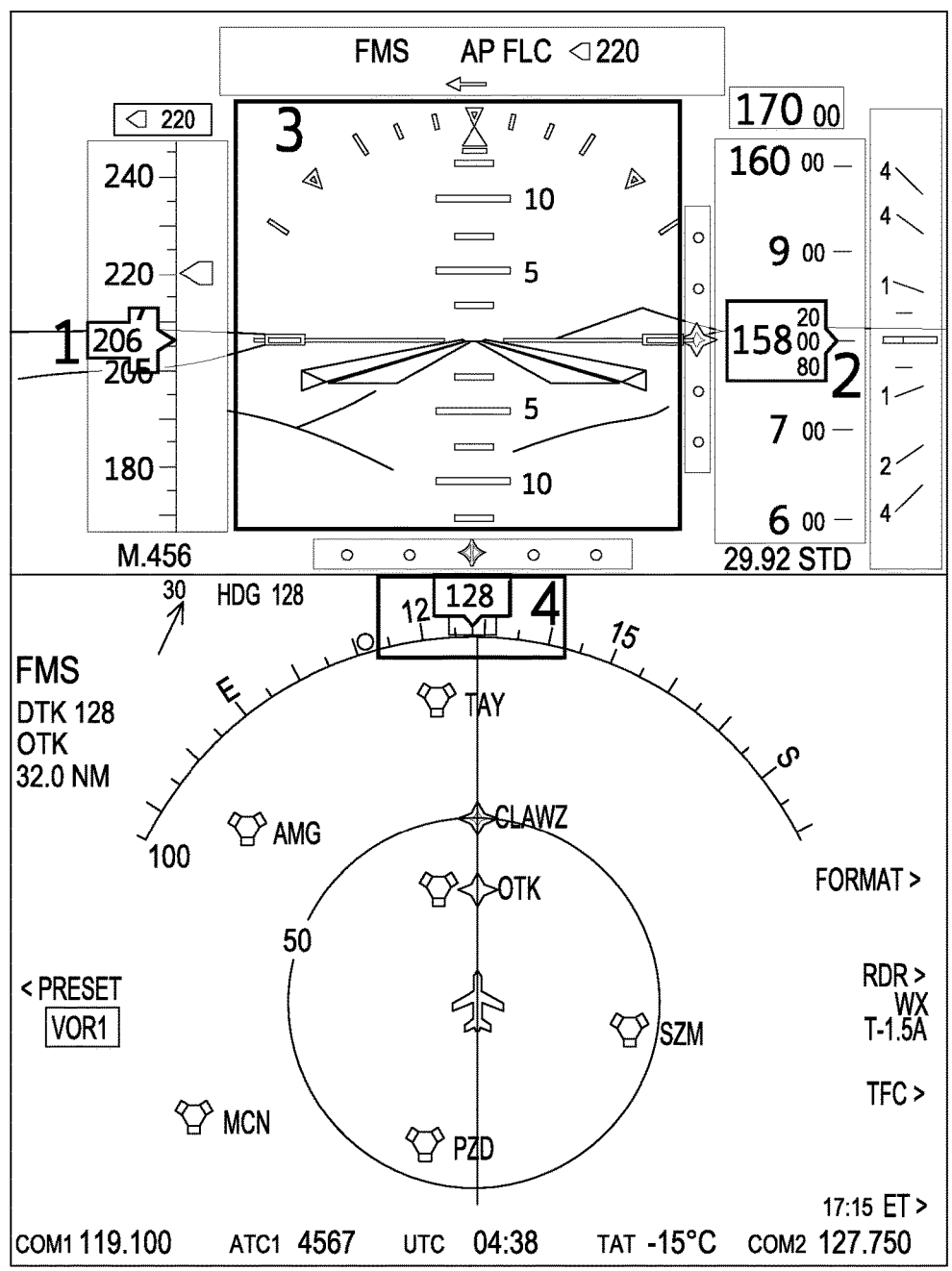
FIG. 2 illustrates an example primary flight display page of an aircraft, having symbols to be monitored.
Figure 3:
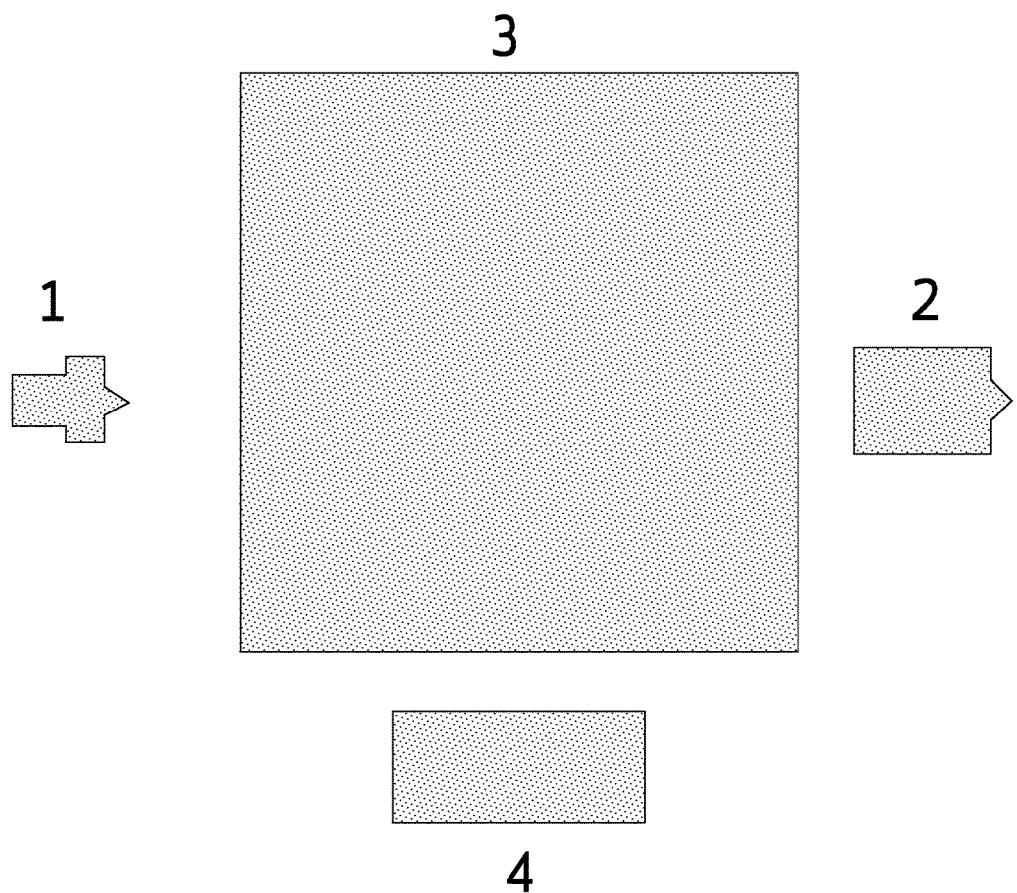
FIG. 3 illustrates a mask stencil utilized by the present system for monitoring graphics processing units.
Figure 4:
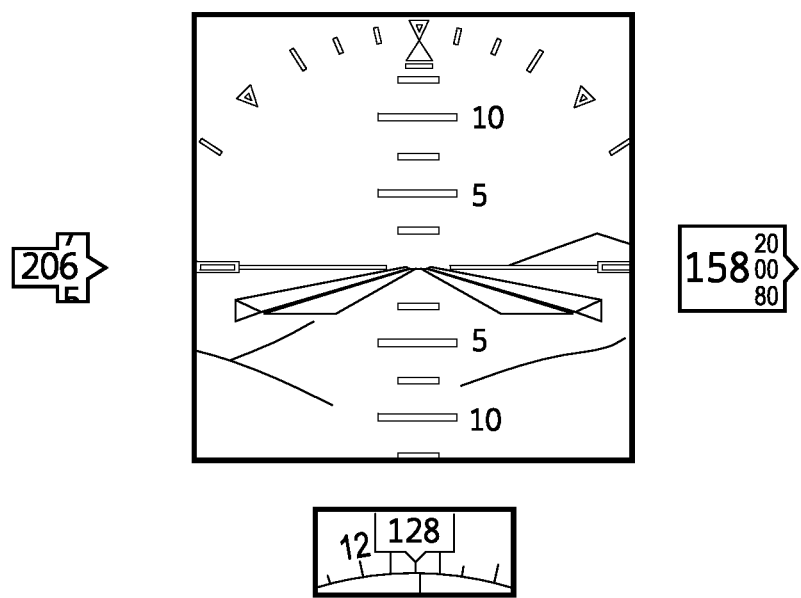
FIG. 4 is the merged image provided by the image merge function.

As another example of operation, consider the primary flight display (PFD) page in FIG. 2. The four image regions marked 1 (Airspeed), 2 (Altitude), 3 (Attitude, i.e. pitch and roll), and 4 (Heading) are critical symbols to be verified by the present invention. The symbol identifier provided by the image generation software would contain the following: an identifier of "PFD page" that would select the mask stencil FIG. 3 from Database Memory; airspeed value of 206.0; altitude value of 15800; Attitude (pitch of 00.0; roll of 00.0); heading of 128. The image merge would (i) look up the four valid CRCs from Database Memory; (ii) "and" the stencil with the image in FIG. 1, giving the image in FIG. 4; (iii) calculate the actual CRCs of the four masked regions in FIG. 4; (iv) compare the four actual CRCs with the four valid CRCs; and, (v) indicate an error if any of the four CRCs have a mismatch.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A system for monitoring graphics processing units (GPUs) wherein independent monitoring of the GPU image generation is provided, comprising:
   a) an image merge element, comprising a Field Programmable Gate Array (FPGA) configured to: i) receive visible image data from a graphics processing unit (GPU); ii) extract the visible image data and a symbol identifier; iii) receive a mask; and, iv) calculate a cyclic redundancy check (CRC) of a masked portion of the visible image data corresponding to said mask, wherein said mask includes only the image coordinates of the visible image data;
   b) a database memory, operatively connected to said image merge element, wherein said database memory comprises a FLASH EPROM, comprising: i) a mask database comprising lookup tables of masks for defined areas of said visible image data indexed by said extracted symbol identifier; and, ii) a CRC signature database comprising a table of valid CRCs for said visible image data indexed by said extracted symbol identifier; and,
   c) a comparator element configured to utilize a bitwise XOR of two 64-bit CRCs to detect an error in the visible image data, said comparator element being configured to: i) receive, from the image merge element, the mask, and the calculated CRC of the masked portion of the visible image data; ii) receive, from the database memory, a valid CRC of a desired image from said indexed table of valid CRCs for said visible image data; and, iii) compare the calculated CRC with the valid CRC of a desired image for providing a fault indication for processing,
   wherein the image merge element calculates CRCs of multiple mask portions of the visible image data, and
   wherein said image merge element extracts the visible image data and the symbol identifier stored by image generation software utilized for generating commands and data issued to said GPU, wherein said image generation software specifies the masks atop visually changing flight symbols for providing independent monitoring of the GPU, for providing a fault indication for processing.

2. The system of claim 1, wherein said CRC is calculated with a 64 bit algorithm.

3. The system of claim 1, further including a display operable in a plurality of defined formats, each defined format comprising a plurality of associated symbols.

4. The system of claim 1, further including a display operable in a plurality of defined formats, each defined format comprising a plurality of associated symbols, wherein said database memory outputs a mask based on said symbol identifier for selecting an area of said format.

5. The system of claim 1, wherein the database memory contains masks that are bitmaps of portions of the image to be verified.

6. The system of claim 1, wherein the database memory contains masks of rectangular portions of the image to be verified, stored as the vertical and horizontal image coordinates of the mask portions.

7. The system of claim 1, wherein said image merge element, said database memory, and said comparator element are components of an avionics display system.

8. A system for monitoring graphics processing units (GPUs) wherein independent monitoring of the GPU image generation is provided, comprising:
   a) an image merge element, comprising a Field Programmable Gate Array (FPGA) configured to: i) receive visible image data from a graphics processing unit (GPU); ii) extract the visible image data and a symbol identifier; iii) receive a mask; and, iv) perform a CRC calculation for error detection to calculate a signature of a masked portion of the visible image data corresponding to said mask, wherein said mask includes only the image coordinates of the visible image data, wherein said CRC calculation is with a 64 bit algorithm;
   b) a database memory, operatively connected to said image merge element, wherein said database memory comprises a FLASH EPROM, comprising: i) a mask database comprising lookup tables of masks for defined areas of said visible image data indexed by said extracted symbol identifier; and, ii) a signature database comprising a table of valid signatures for said image data indexed by said extracted symbol identifier; and,
   c) a comparator element configured to utilize a bitwise XOR of two 64-bit CRCs to detect an error in the visible image data, said comparator element being configured to: i) receive, from the image merge element, the mask, and the calculated signature of the masked portion of the visible image data; ii) receive, from the database memory, a valid signature of a desired image from said indexed table of valid signatures for said visible image data; and, iii) compare the calculated signature with the valid signature of a desired image for providing a fault indication for processing
   wherein the image merge element calculates CRCs of multiple mask portions of the visible image data, and
   wherein said image merge element extracts the visible image data and the symbol identifier stored by image generation software utilized for generating commands and data issued to said GPU, wherein said image generation software specifies the masks atop visually changing flight symbols for providing independent monitoring of the GPU for providing a fault indication for processing.

9. A method for monitoring graphics processing units (GPUs) wherein independent monitoring of the GPU image generation is provided, comprising the steps of:
   a) utilizing an image merge element, comprising a Field Programmable Gate Array (FPGA) for receiving a visible image data from a graphics processing unit (GPU);
   b) extracting the visible image data and a symbol identifier, utilizing said image merge element;
   c) utilizing said image merge element for receiving a mask;
   d) utilizing said image merge element for calculating a cyclic redundancy check (CRC) of a masked portion of the visible image data corresponding to said mask, wherein said mask includes only the image coordinates of the visible image data;
   e) providing a database memory, operatively connected to said image merge element, wherein said database memory comprises a FLASH EPROM, comprising: i) a mask database comprising lookup tables of masks for defined areas of said visible image data indexed by said extracted symbol identifier; and, ii) a CRC signature database comprising a table of valid CRCs for said image data indexed by said extracted symbol identifier, said CRC signature database comprising a database comprising expected CRC values used for error detection; and,
   f) utilizing a comparator element for receiving, from the image merge element, the mask, and the calculated CRC of the masked portion of the visible image data;
   g) utilizing said comparator element configured to utilize a bitwise XOR of two 64-bit CRCs to detect an error in the visible image data, said comparator element being for receiving, from the database memory, a valid CRC of a desired image from said indexed table of valid CRCs for said visible image data; and,
   h) comparing the calculated CRC with the valid CRC of a desired image for providing a fault indication for processing,
   wherein said image merge element extracts the visible image data and the symbol identifier stored by image generation software utilized for generating commands and data issued to said GPU,
   wherein said image generation software specifies the masks atop visually changing flight symbols for providing independent monitoring of the GPU, said independent monitoring being monitoring without changing image data that is not visible image data, for providing a fault indication for processing.

10. The method of claim 9, wherein said image merge element extracts the symbol identifier stored by image generation software utilized for generating commands and data issued to said GPU.

11. The method of claim 9, further including the step of utilizing a display operable in a plurality of defined formats, each defined format comprising a plurality of associated symbols.

12. The system of claim 8, wherein the database memory contains masks that are bitmaps of portions of the image to be verified.

13. The system of claim 8, wherein the database memory contains masks of rectangular portions of the image to be verified, stored as the vertical and horizontal image coordinates of the mask portions.

14. The system of claim 8, wherein said image merge element, said database memory, and said comparator element are components of an avionics display system.

* * * * *